Patented June 29, 1943

2,323,111

UNITED STATES PATENT OFFICE 2,323,111

PROCESS AND PRODUCT

Paul Rolland Austin and Charles Edward Frank, Wilmington, Del., assignors to E. I. du Pont de Nemours & Company, Wilmington, Del., a corporation of Delaware No Drawing. Application September 29, 1939, Serial No. 297,190

12 Claims. (Cl. 260—399)

This invention relates to organic compounds, more particularly to amides and specifically to thioethers of N-mercaptomethyl amides of monobasic acids.

This invention has as an object the preparation of thioethers of N-mercaptomethyl amides of monobasic acids. A further object is the provision of a process for the preparation of these amides. A further object is the preparation of new compounds of use as pesticides, rubber chemicals, and petroleum chemicals. Other objects will appear hereinafter.

These objects are accomplished by the following invention wherein a methylol amide of an aliphatic monobasic acid having a monovalent organic radical of at least three carbon atoms attached through carbon to the carboxyl group is reacted with an aliphatic mercaptan to form an aliphatic thioether of the N-mercaptomethyl amide of the monobasic acid. In the preferred practice of this invention, an acid catalyst is used, the reaction is carried out at room temperature, and a suitable solvent is employed.

A methylol amide or methylol lactam, such as methylol lauramide, and a mercaptan, such as ethyl mercaptan, in approximately equimolar amounts are dissolved or suspended in a suitable solvent, such as ethyl alcohol. A mixture of the amide or lactam and formaldehyde (or formaldehyde generating agent) may be substituted for the methylolamide or methylol lactam, thereby forming the methylol compound as an intermediate in the reaction mixture. An acid, such as hydrochloric acid, is added to catalyze the reaction, and the mixture or solution is let stand 12–16 hours at room temperature, or heated to complete the reaction in a shorter time. The reaction mixture is poured into several volumes of water to precipitate the reaction product. If desired, the acidic catalyst may be neutralized by adding to the water an alkaline reagent such as sodium carbonate. The crude product may be purified by crystallization from a suitable solvent such as ethyl alcohol, or, in certain cases, by distillation.

The more detailed practice of the invention is illustrated by the following examples, wherein parts given are by weight. There are of course many forms of the invention other than these specific embodiments.

Example I

To 35 parts of methylol lauramide partly dissolved and partly suspended in 240 parts of ethyl alcohol at room temperature is added 14 parts of ethyl mercaptan. With agitation, 36 parts of concentrated hydrochloric acid is slowly added to the mixture. The resultant solution is let stand 16–20 hours, then poured into 1000 parts of ice water. The precipitated product is removed by filtration, washed several times with water and air dried. A theoretical yield (44 parts) of crude N-(ethylthiomethyl)-lauramide melting at 59–60° C. is obtained. After several crystallizations from 70% alcohol, the product melts at 62–63°. The sulfur content is 11.80, the theoretical sulfur content for $C_{15}H_{31}NOS$ being 11.73.

Example II

To a cold mixture of 41 parts of methylol caprylamide, 18 parts of ethyl mercaptan and 160 parts of ethyl alcohol, there is slowly added 48 parts of concentrated hydrochloric acid. The resultant solution is let stand three days and then poured into 400 parts of cold water. The precipitated product is removed by filtration, washed with cold water and air dried. A 96% yield (49 parts) of crude N-(ethylthiomethyl)-caprylamide is obtained. After several crystallizations from ethyl alcohol, the product melts at 37–38° C. The sulfur content is 14.68, the theoretical sulfur content for $C_{11}H_{23}NOS$ being 14.75.

Example III

To methylol stearamide (78 parts) partly dissolved and partly suspended in 320 parts of ethyl alcohol there is added 18 parts of ethyl mercaptan. With shaking, 83 parts of concentrated hydrochloric acid is added slowly. The resultant mixture is let stand three days and then poured into 1000 parts of cold water. The precipitated product is removed by filtration, washed with water and air dried. A 67% yield (60 parts) of crude N-(ethylthiomethyl)-stearamide is obtained. After several crystallizations from ethyl alcohol and from ethyl acetate, the product melts at 83.6° C. The sulfur content is 7.74, the theoretical sulfur content for $C_{21}H_{43}NOS$ being 8.96.

Example IV

A mixture of 113 parts of caprolactam, 45 parts of paraformaldehyde, 3 parts of sodium hydroxide, and 200 parts of alcohol is heated at 40–50° for 3–4 hours and allowed to stand 12–16 hours. This solution is treated with 48 parts of concentrated hydrochloric acid, the mixture filtered and the filtrate treated with 93 parts of ethyl mercaptan and allowed to stand 12-16 hours. The reaction mixture is poured into 500 parts of 5% sodium hydroxide solution, the oily layer drawn off, washed with 100 parts of alkali and 100 parts of water, the formation of a layer being facilitated by the addition of 100 parts of ether. The extract is dried with anhydrous sodium sulfate. Distillation produces 122 parts of N-(ethylthiomethyl)-caprolactam, a clear liquid boiling at 138–41° C./5–6 mm. (65% yield). The sulfur content is 17.30, the theoretical sulfur content for $C_9H_{17}NOS$ being 17.12.

*Example V*

A mixture of 1.7 parts lauramide, 1.5 parts paraformaldehyde, 1.3 parts ethyl mercaptan, 1.2 parts concentrated hydrochloric acid, and 40 parts ethyl alcohol is warmed a few minutes on a steam bath under reflux. The resultant solution is let stand several hours at room temperature, then poured into 500 parts of water. The precipitated product is removed by filtration, washed with water and air dried. An 80% yield (1.6 parts) of crude N-(ethylthiomethyl)-lauramide is obtained. Upon recrystallization the product melts at 62–63° C.

This invention is generic to the reaction of methylol amides of aliphatic monocarboxylic acids of at least four carbon atoms, including butyric acid, isobutyric acid, the isomeric valeric, caproic and capric acids, palmitic acid, stearic acid, lauric acid, linoleic acid, oleic acid, linolenic acid, mixtures of these acids derived from natural or hydrogenated fats or oils, undecylenic acid, methacrylic acid, and crotonic acid. It is also applicable to N-methylol derivatives of cyclic amides (lactams) such as N-methylol butyrolactam, N-methylol-gamma-valerolactam, N-methylol-delta-valerolactam, N-methylol-ω-caprolactam, etc.

Any aliphatic mercaptan may be used including methyl, ethyl, propyl, amyl, and butyl mercaptans, and mixed isomeric amyl mercaptans derived from mixed amyl chlorides, dodecyl, hexadecyl, and octadecyl mercaptans, and dimercaptans, such as ethylene and hexamethylene dimercaptans. The alkyl mercaptans are preferred.

The invention may be operated over a wide temperature range, depending on the reactivities of individual components of the reaction mixture and the solvent employed. In general, with the more active compounds, reaction is practically complete within a few hours at room temperature, in some cases within a few minutes. With less active compounds, especially when operating without a catalyst, condensation is effected by heating at temperatures between 30° and 150° C. and preferably between 50–100° C. It is often convenient to carry out the reaction at the boiling point of the solvent or one of the reactants used.

The methylol compound may be previously isolated and used as such, or it may be formed in the reaction solution from the amide (or lactam) and formaldehyde or a formaldehyde generating agent. The formaldehyde may be added as a gas, as a solution, or as a solid (paraformaldehyde or polyoxymethylene glycols). Among other formaldehyde sources are formals such as methylal, cyclic formaldehyde derivatives such as s-trioxane, and the various formaldehyde polymers known as alpha-, beta-, gamma-, delta-, epsilon-polyoxymethylenes.

The reaction is generally carried out using approximately equimolar amounts of the reactants, but an excess of one of the reagents may be employed to insure complete reaction. The order of addition of the reacants to the reaction mixture may be varied. Usually the acid catalyst is added to a solution of the methylol compound and the mercaptan, the methylol compound having been formed or placed in solution before adding the mercaptan. However, the amide or lactam, formaldehyde, mercaptan and catalyst may be placed in solution simultaneously and these components interacted in one step. Alternatively, the mercaptal or hemimercaptal may be formed first and subsequently reacted with the amide.

Solvents such as alcohols, ethers and hydrocarbons which are inert under the conditions of the process may be employed. The amount and nature of the solvent most suitable depends upon the components and the conditions of the process. In certain cases the solvent may be omitted entirely.

Acidic catalysts facilitate the reaction. Suitable acids include hydrochloric, hydrobromic, sulfuric, phosphoric, hydrofluoric, benzene sulfonic, and trichloracetic or other organic acids. In addition, acidic salts and acid-yielding substances such as boron trifluoride, thionyl chloride, phosphorus chlorides and oxychlorides or sodium bisulfate are effective.

This invention affords a simple, easy, and economical method whereby thioether derivatives of acid amides, including lactams, may be obtained in good yields.

These N-alkylthiomethyl derivatives of monobasic amides, including lactams, are useful as pesticides, rubber chemicals, and petroleum chemicals.

The above description and examples are intended to be illustrative only. Any modification of or variation therefrom which conforms to the spirit of the invention is intended to be included within the scope of the claims.

What is claimed is:

1. An ether of an N-thiomethylamide of an open chain aliphatic monocarboxylic acid of at least four carbon atoms wherein the hydrogen of the mercapto group is replaced by a monovalent aliphatic hydrocarbon radical.

2. A compound of the formula

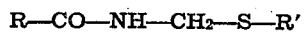

$$R-CO-NH-CH_2-S-R'$$

wherein R is a monovalent aliphatic radical of at least three carbon atoms joined through carbon to the remainder of the molecule and R' is a monovalent aliphatic hydrocarbon radical.

3. An ether of an N-mercaptomethylamide of an open chain aliphatic monocarboxylic acid of at least four carbon atoms wherein the hydrogen of the mercapto group is replaced by a monovalent aliphatic hydrocarbon radical.

4. An N-(alkylthiomethyl)amide of an open chain aliphatic monocarboxylic acid of at least four carbon atoms.

5. An N-(alkylthiomethyl)amide of a fatty acid.

6. N-ethylthiomethyllauramide.

7. Process for the manufacture of condensation products, which comprises reacting, in the presence of an acid, an aliphatic hydrocarbon mercaptan with an N-methylolamide of an open chain aliphatic monocarboxylic acid of at least four carbon atoms.

8. Process for the manufacture of condensation products, which comprises reacting, in the presence of an acid, an alkyl mercaptan with an N-methylolamide of an open chain aliphatic monocarboxylic acid of at least four carbon atoms.

9. Process for the manufacture of condensation products, which comprises reacting, in the presence of an acid, an aliphatic hydrocarbon mercaptan with a methylolamide of a fatty acid.

10. Process for the manufacture of condensation products, which comprises reacting, in the presence of an acid, an alkyl mercaptan with a methylolamide of a fatty acid.

11. Process for the manufacture of condensation products, which comprises reacting, in the presence of an acid, ethanthiol with N-methylollauramide.

12. Process for the manufacture of condensation products, which comprises reacting, in the presence of an acid, an alkyl mercaptan with an amide of a fatty acid in the presence of a formaldehyde generating agent.

PAUL ROLLAND AUSTIN.
CHARLES EDWARD FRANK.